(12) United States Patent
Liu et al.

(10) Patent No.: US 12,333,853 B2
(45) Date of Patent: Jun. 17, 2025

(54) FACE PARSING METHOD AND RELATED DEVICES

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventors: Yinglu Liu, Beijing (CN); Hailin Shi, Beijing (CN); Tao Mei, Beijing (CN)

(73) Assignees: BEIJING JINGDONG SHANGKE INFORMATION TECHNOLOGY CO, LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 348 days.

(21) Appl. No.: 17/777,045

(22) PCT Filed: Aug. 18, 2020

(86) PCT No.: PCT/CN2020/109826
§ 371 (c)(1),
(2) Date: May 15, 2022

(87) PCT Pub. No.: WO2021/098300
PCT Pub. Date: May 27, 2021

(65) Prior Publication Data
US 2022/0406090 A1     Dec. 22, 2022

(30) Foreign Application Priority Data
Nov. 18, 2019  (CN) .......................... 201911125557.7

(51) Int. Cl.
*G06V 40/16*    (2022.01)
*G06V 10/82*    (2022.01)

(52) U.S. Cl.
CPC ............ *G06V 40/162* (2022.01); *G06V 10/82* (2022.01); *G06V 40/168* (2022.01)

(58) Field of Classification Search
CPC .... G06V 40/162; G06V 10/82; G06V 40/168; G06V 10/80; G06V 10/774; G06V 40/16;
(Continued)

(56) References Cited

U.S. PATENT DOCUMENTS 10,496,884 B1 * 12/2019 Nguyen ............... G06V 30/413
10,528,846 B2    1/2020 Kim et al.
(Continued)

FOREIGN PATENT DOCUMENTS

CN    108062543 A    5/2018
CN    108073876 A    5/2018
(Continued)

OTHER PUBLICATIONS

"Communication with Supplementary European Search Report", EP Application No. 20889944.3, Oct. 9, 2023, 13 pp.
(Continued)

*Primary Examiner* — Negussie Worku
(74) *Attorney, Agent, or Firm* — Myers Bigel, P.A.

(57) ABSTRACT

A facial parsing method and apparatus, a facial parsing network training method and apparatus, an electronic device and a non-transitory computer-readable storage medium, which relate to the field of artificial intelligence. The facial parsing method includes inputting a facial image into a pre-trained facial parsing neural network; extracting a semantic feature of the facial image by using a semantic perception sub-network; extracting a boundary feature of the facial image by using a boundary perception sub-network; and processing the cascaded semantic feature and boundary feature by using a fusion sub-network, to obtain a facial region to which each pixel in the facial image belongs. The (Continued)

method can improve the resolution capability of a neural network for boundary pixels between different facial regions of a facial image, thereby improving the precision of facial parsing.

17 Claims, 3 Drawing Sheets

(58) Field of Classification Search
CPC .... G06V 40/161; G06V 40/172; G06N 3/045; G06N 3/0455; G06N 3/0464; G06N 3/09; G06F 18/2193; G06F 18/253
USPC .......................................................... 382/157
See application file for complete search history.

(56) References Cited

U.S. PATENT DOCUMENTS

| | | | |
|---|---|---|---|
| 10,776,614 B2* | 9/2020 | Wu ....................... | G06V 40/168 |
| 10,853,039 B2* | 12/2020 | Patel .................... | G06Q 10/087 |
| 11,373,352 B1* | 6/2022 | Gafni ...................... | G06T 11/60 |
| 11,494,637 B2* | 11/2022 | Chakraborty ....... | G06F 21/6227 |
| 11,847,804 B1* | 12/2023 | Ivanov ................... | G06V 40/70 |
| 12,056,909 B2* | 8/2024 | Kim ....................... | G06V 10/82 |
| 2011/0198830 A1* | 8/2011 | Davis .................. | B62D 23/005 |
| | | | 280/783 |
| 2015/0206064 A1* | 7/2015 | Levman ................. | G06N 20/00 |
| | | | 706/12 |
| 2018/0137388 A1* | 5/2018 | Kim ....................... | G06F 18/295 |
| 2018/0157899 A1* | 6/2018 | Xu ............................ | G06N 3/08 |
| 2019/0156154 A1 | 5/2019 | Tu et al. | |
| 2021/0117662 A1* | 4/2021 | Wang .................... | G06V 10/454 |
| 2022/0129689 A1* | 4/2022 | Kim ........................ | G06V 10/82 |
| 2022/0406090 A1* | 12/2022 | Liu ....................... | G06N 3/0455 |
| 2023/0074706 A1* | 3/2023 | Xiao .................. | G06V 30/1444 |
| 2023/0081645 A1* | 3/2023 | Yao ......................... | G06V 10/82 |
| 2024/0135511 A1* | 4/2024 | Singh .................... | G06F 3/0486 |

FOREIGN PATENT DOCUMENTS

| | | |
|---|---|---|
| CN | 109255784 A | 1/2019 |
| CN | 109741331 A | 5/2019 |
| CN | 110059768 A | 7/2019 |
| CN | 110070091 A | 7/2019 |
| CN | 110148145 A | 8/2019 |
| CN | 110348322 A | 10/2019 |

OTHER PUBLICATIONS

Ruan, Tao , et al., "Devil in the Details: Towards Accurate Isngle and Multiple Human Parsing", arXiv:1809.05996v3, arxiv.org, Cornell University Library, Nov. 29, 2018, 9 pp.

Shen, Haocheng , et al., "Boundary-Aware Fully Convolutional Network for Brain Tumor Segmentation", In: M. Descoteaux et al. (eds), MICCAI 2017 - Medical Image Computing and Computer-Assisted Intervention, Part II, Lecture Notes in Computer Science, vol. 10434, Springer International Publish AG, Sep. 4, 2017, pp. 433-441.

"English language translation of International Search Report and Written Opinion of the International Searching Authority", International Application No. PCT/CN2020/109826, Nov. 19, 2020, 6 pp.

Khan, Muhammad Zeeshan, et al., "Deep Unified Model for Face Recognition Based on Convolution Neural Network and Edge Computing", IEEE Access, vol. 7, May 23, 2019, pp. 72622-72633.

Qin, Xuebin , et al., "BASNet: Boundary-Aware Salient Object Detection", 2019 IEEE/CVF Conference on Computer Vision and Pattern Recognition (CVPR), Jun. 20, 2019, pp. 7479-7489.

"Measuring model loss from Machine Learning for Finance", retrieved Feb. 15, 2024 from https://subscription.packtpub.com/book/data/9781789136364/1/ch01lvl1sec21/measuring-model-loss, May 2019, 15 pp.

"Notice of Reasons for Refusal and English language translation", JP Application No. 2022-528685, Feb. 26, 2024, 13 pp.

@KLIS (HIMKT) , "Multiclass cross-entropy error function and Softmax function with English language translation", retrieved on Feb. 15, 2024 from https://qiita.com/klis/items/4ad3032d02ff815e09e6, Aug. 19, 2018, 6 pp.

Ruan, Tao , et al., "Devil in the Details: Towards Accurate Single and Multiple Human Parsing", retrieved Feb. 15, 2024 from https://arxiv.org/abs/1809.05996, Nov. 29, 2018, 9 pp.

"English translation of CN Notice of First Review Opinion", CN Application No. 201911125557.7, May 12, 2023, 8 pp.

Chen, Xi , "Boundary-Aware Network for Fast and High-Accuracy Portrait Segmentation", arXiv:1901.03814v1 (https://doi.org/10.48550/arXiv.1901.03814), Jan. 12, 2019, 9 pp.

"Examination report under sections 12 & 13 of the Patents Act, 1979 and the Patent Rules, 2003", Indian Application No. 202237028261, Apr. 2, 2025, 6 pp.

Hatamizadeh, et al., "End-to-End Boundary Aware Networks for Medical Image Segmentation", arXiv: 1908.08071v2 [cs.CV], retrieved from https://doi.org/10.48550/arXiv.1908.08071, Sep. 10, 2019, 8 pp.

* cited by examiner

FACE PARSING METHOD AND RELATED DEVICES

CROSS-REFERENCE TO RELATED APPLICATIONS

The present disclosure is a U.S. National Stage Application under 35 U.S.C. § 371 of International Patent Application No. PCT/CN2020/109826, filed on Aug. 18, 2020, which is based on and claims priority of Chinese application for invention No. 201911125557.7, filed on Nov. 18, 2019, the disclosure of both of which are hereby incorporated into this disclosure by reference in its entirety.

TECHNICAL FIELD

The present disclosure relates to the field of artificial intelligence, in particular to a face parsing method and apparatus, a training method and apparatus for a face parsing network, an electronic device and a non-transitory computer-readable storage medium.

BACKGROUND

Face parsing refers to assigning a semantic label to each pixel in a facial image to represent a facial region to which each pixel belongs, such as hair, facial skin, eyebrows, eyes, nose, mouth and so on.

In recent years, with the development of deep learning and the maturity of artificial intelligence technology, face parsing technology is increasingly adopted in face-related applications, such as face synthesis, face augmented reality technology and so on.

SUMMARY

According to a first aspect of the present disclosure, there is provided a face parsing method, comprising: inputting a facial image into a pre-trained face parsing neural network; extracting a semantic feature from the facial image using a semantic perception sub-network of the face parsing neural network, the semantic feature representing probabilities that each pixel in the facial image belongs to various facial regions; extracting a boundary feature from the facial image using a boundary perception sub-network of the face parsing neural network, the boundary feature representing probabilities that each pixel in the facial image belongs to boundaries between different facial regions; and processing the concatenated semantic feature and boundary feature using a fusion sub-network of the face parsing neural network to obtain a facial region to which each pixel in the facial image belongs.

In some embodiments, the face parsing method further comprises: training a face parsing neural network using sample facial images annotated with a facial region to which each pixel belongs, wherein the trained face parsing neural network outputs a facial region to which each pixel in a facial image belongs according to an input facial image.

In some embodiments, a loss function used in training the facial parsing neural network includes a loss function of the semantic perception sub-network and a loss function of the boundary perception sub-network, wherein: the loss function of the semantic perception sub-network is determined according to prediction probabilities that each pixel of the semantic feature belongs to various facial regions, and a facial region each pixel of the semantic feature actually belongs to; the loss function of the boundary perception sub-network is determined according to prediction probabilities that each pixel of the boundary feature belongs to boundaries between different facial regions, and whether each pixel of the boundary feature actually belongs to the boundaries.

In some embodiments, processing the concatenated semantic feature and boundary feature using a fusion sub-network of the face parsing neural network to obtain a facial region to which each pixel in the facial image belongs comprises: processing the concatenated semantic feature and boundary feature using a fusion sub-network of the face parsing neural network to obtain a fusion feature of the facial image, the fusion feature representing prediction probabilities that each pixel in the facial image belongs to various facial regions and prediction probabilities that each pixel in the facial image belongs to the boundaries; determining a facial region to which each pixel in the facial image belongs according to the fusion feature.

In some embodiments, the loss function used in training the facial parsing neural network further comprises a loss function of the fusion sub-network; wherein the loss function of the fusion sub-network is determined according to prediction probabilities that each pixel of the fusion feature belongs to various facial regions, a facial region each pixel of the fusion feature actually belongs to, and whether each pixel of the fusion feature belongs to the boundaries.

In some embodiments, the loss function $L_s$ of the semantic perception sub-network is $$L_s = -\frac{1}{N}\sum_{i=1}^{N}\sum_{j=1}^{C} y_{ij}^s \log p_{ij}^s$$

wherein: N is the total number of pixels in the semantic feature, i is an identity of pixels in the semantic feature, C is the total number of categories of facial regions, j is an identity of the categories of the facial regions; $y_{ij}^s=1$ if pixel i actually belongs to facial region j, $y_{ij}^s=0$ if pixel i does not actually belong to facial region j, and $p_{ij}^s$ is the prediction probability that pixel i belongs to facial region j.

In some embodiments, the loss function $L_b$ of the boundary perception sub-network is $$L_b = -\frac{1}{N}\sum_{i=1}^{N}\left(y_i^b \log p_i^b + (1-y_i^b)\log(1-p_i^b)\right)$$

wherein: N is the total number of pixels in the boundary feature, i is an identity of pixels in the boundary feature, $y_i^b=1$ if pixel i actually belongs to the boundaries, $y_i^b=0$ if pixel i does not actually belong to the boundaries, and $p_i^b$ is the prediction probability that pixel i belongs to the boundaries.

In some embodiments, the loss function $L_f$ of the fusion sub-network is $$L_f = -\frac{1}{N}\sum_{i=1}^{N}\sum_{j=1}^{C} w_i y_{ij}^s \log p_{ij}^s$$

wherein: N is the total number of pixels in the fusion feature, i is an identity of pixels in the fusion feature, C is the total number of categories of facial regions, j is an identity of the categories of the facial regions, $y_{ij}^s=1$ if pixel i actually belongs to facial region j, $y_{ij}^s=0$ if pixel i does not actually belong to facial region j, $p_{ij}^s$ is the prediction probability that pixel i belongs to facial region j, $w_i>1$ if pixel i actually belongs to the boundaries, and $w_i=1$ if pixel i does not actually belong to the boundaries.

In some embodiments, the semantic perception sub-network includes a convolution layer; and extracting a semantic feature from the facial image using a semantic perception sub-network comprises performing dilated convolution on the facial image using the convolution layer to obtain a convolution feature.

In some embodiments, the semantic perception sub-network further comprises a pooling layer; and extracting a semantic feature from the facial image using a semantic perception sub-network further comprises: performing multi-scale pooling of the convolution feature using the pooling layer to obtain multi-scale pooled features, and concatenating the multi-scale pooled features and the convolution feature.

In some embodiments, the boundary perception sub-network and the fusion sub-network comprise a convolution layer.

According to a second aspect of the present disclosure, there is provided a training method for a face parsing neural network, comprising: training the face parsing neural network in advance using sample facial images annotated with a facial region to which each pixel belongs, wherein: the trained face parsing neural network is configured to output a facial region to which each pixel in the facial image belongs according to an input facial image; the facial parsing neural network comprises a semantic perception sub-network, a boundary perception sub-network and a fusion sub-network; the semantic perception sub-network is configured to extract a semantic feature from the sample facial images, the semantic feature representing probabilities that each pixel in the sample facial images belongs to various facial regions; the boundary perception sub-network is configured to extract a boundary feature from the sample facial images, the boundary feature representing probabilities that each pixel in the facial image belongs to boundaries between different facial regions; and the fusion sub-network is configured to process the concatenated semantic feature and boundary feature to obtain a facial region to which each pixel in the sample facial images belongs.

In some embodiments, a loss function used in training the facial parsing neural network includes a loss function of the semantic perception sub-network and a loss function of the boundary perception sub-network, wherein: the loss function of the semantic perception sub-network is determined according to prediction probabilities that each pixel of the semantic feature belongs to various facial regions, and a facial region each pixel of the semantic feature actually belongs to; and the loss function of the boundary perception sub-network is determined according to prediction probabilities that each pixel of the boundary feature belongs to boundaries between different facial regions, and whether each pixel of the boundary feature actually belongs to the boundaries.

In some embodiments, the fusion sub-network of the face parsing neural network is configured to process the concatenated semantic feature and boundary feature to obtain a fusion feature of the sample facial images, wherein: the fusion feature represents prediction probabilities that each pixel in the sample facial images belongs to various facial regions and prediction probabilities that each pixel in the sample facial images belongs to the boundaries; and the fusion feature is configured to determine a facial region to which each pixel in the sample facial images belongs.

In some embodiments, the loss function used in training the facial parsing neural network further comprises a loss function of the fusion sub-network; wherein the loss function of the fusion sub-network is determined according to prediction probabilities that each pixel of the fusion feature belongs to various facial regions, a facial region each pixel of the fusion feature actually belongs to, and whether each pixel of the fusion feature belongs to the boundaries.

In some embodiments, the loss function $L_s$ of the semantic perception sub-network is $$L_s = -\frac{1}{N}\sum_{i=1}^{N}\sum_{j=1}^{C} y_{ij}^s \log p_{ij}^s$$

wherein: N is the total number of pixels in the semantic feature, i is an identity of the pixels in the semantic feature, C is the total number of categories of facial regions, and j is an identity of the categories of the facial region; $y_{ij}^s=1$ if pixel i actually belongs to facial region j, $y_{ij}^s=0$ if pixel i does not actually belong to facial region j, and $p_{ij}^s$ is the prediction probability that pixel i belongs to facial region j.

In some embodiments, the loss function $L_b$ of the boundary perception sub-network is $$L_b = -\frac{1}{N}\sum_{i=1}^{N}\left(y_i^b \log p_i^b + (1-y_i^b)\log(1-p_i^b)\right)$$

wherein: N is the total number of pixels in the boundary feature, i is an identity of pixels in the boundary feature, $y_i^b=1$ if pixel i actually belongs to the boundaries, $y_i^b=0$ if pixel i does not actually belong to the boundaries, and $p_i^b$ is the prediction probability that pixel i belongs to the boundaries.

In some embodiments, the loss function $L_f$ of the fusion sub-network is $$L_f = -\frac{1}{N}\sum_{i=1}^{N}\sum_{j=1}^{C} w_i y_{ij}^s \log p_{ij}^s$$

wherein: N is the total number of pixels in the fusion feature, i is an identity of pixels in the fusion feature, C is the total number of categories of facial regions, j is an identity of the categories of the facial regions, $y_{ij}^s=1$ if pixel i actually belongs to facial region j, $y_{ij}^s=0$ if pixel i does not actually belong to facial region j, $p_{ij}^s$ is the prediction probability that pixel i belongs to facial region j, $w_i>1$ if pixel i actually belongs to the boundaries, and $w_i=1$ if pixel i does not actually belong to the boundaries.

According to a third aspect of the present disclosure, there is provided a face parsing apparatus, comprising: an image input module configured to input a facial image into a pre-trained face parsing neural network; a semantic feature extraction module configured to extract a semantic feature from the facial image using a semantic perception sub-network of the face parsing neural network, the semantic feature representing probabilities that each pixel in the facial image belongs to various facial regions; a boundary feature extraction module configured to extract a boundary feature from the facial image using a boundary perception sub-network of the face parsing neural network, the boundary feature representing probabilities that each pixel in the facial image belongs to boundaries between different facial regions; and a face parsing module configured to process the concatenated semantic feature and boundary feature using a fusion sub-network of the face parsing neural network to obtain a facial region to which each pixel in the facial image belongs.

In some embodiments, the face parsing apparatus further comprises a network training module configured to train a face parsing neural network using sample facial images annotated with a facial region to which each pixel belongs, wherein the trained face parsing neural network outputs a facial region to which each pixel in an input facial image belongs according to the input facial image.

In some embodiments, a loss function adopted by the network training module to train the face parsing neural network comprises a loss function of the semantic perception sub-network and a loss function of the boundary perception sub-network, wherein: the loss function of the semantic perception sub-network is determined according to prediction probabilities that each pixel of the semantic feature belongs to various facial regions, and a facial region each pixel of the semantic feature actually belongs to; and the loss function of the boundary perception sub-network is determined according to prediction probabilities that each pixel of the boundary feature belongs to boundaries between different facial regions, and whether each pixel of the boundary feature actually belongs to the boundaries.

In some embodiments, the face parsing module is configured to process the concatenated semantic feature and boundary feature using a fusion sub-network of the face parsing neural network to obtain a fusion feature of the facial image, the fusion feature representing prediction probabilities that each pixel in the facial image belongs to various facial regions and prediction probabilities that each pixel in the facial image belongs to boundaries, and determine a facial region to which each pixel in the facial image belong according to the fusion feature.

In some embodiments, the loss function adopted by the network training module to train the face parsing neural network further comprises a loss function of the fusion sub-network; wherein the loss function of the fusion sub-network is determined according to prediction probabilities that each pixel of the fusion feature belongs to various facial regions, a facial region each pixel of the fusion feature actually belongs to, and whether each pixel of the fusion feature belongs to the boundaries.

In some embodiments, the loss function $L_s$ of the semantic perception sub-network is $$L_s = -\frac{1}{N}\sum_{i=1}^{N}\sum_{j=1}^{C} y_{ij}^s \log p_{ij}^s$$

wherein: N is the total number of pixels in the semantic feature, i is an identity of pixels in the semantic feature, C is the total number of categories of facial regions, j is an identity of the categories of the facial regions; $y_{ij}^s=1$ if pixel i actually belongs to facial region j, $y_{ij}^s=0$ if pixel i does not actually belong to facial region j, and $p_{ij}^s$ is the prediction probability that pixel i belongs to facial region j.

In some embodiments, the loss function $L_b$ of the boundary perception sub-network is $$L_b = -\frac{1}{N}\sum_{i=1}^{N}\left(y_i^b \log p_i^b + (1-y_i^b)\log(1-p_i^b)\right)$$

wherein: N is the total number of pixels in the boundary feature, i is an identity of pixels in the boundary feature, $y_i^b=1$ if pixel i actually belongs to the boundaries, $y_i^b=0$ if pixel i does not actually belong to the boundaries, and $p_i^b$ is the prediction probability that pixel i belongs to the boundaries.

In some embodiments, the loss function $L_f$ of the fusion sub-network is $$L_f = -\frac{1}{N}\sum_{i=1}^{N}\sum_{j=1}^{C} w_i y_{ij}^s \log p_{ij}^s$$

wherein: N is the total number of pixels in the fusion feature, i is an identity of pixels in the fusion feature, C is the total number of categories of facial regions, j is an identity of the categories of the facial regions, $y_{ij}^s=1$ if pixel i actually belongs to facial region j, $y_{ij}^s=0$ if pixel i does not actually belong to facial region j, $p_{ij}^s$ is the prediction probability that pixel i belongs to facial region j, $w_i>1$ if pixel i actually belongs to the boundaries, and $w_i=1$ if pixel i does not actually belong to the boundaries.

In some embodiments, the semantic perception sub-network includes a convolution layer; and the semantic feature extraction module is configured to perform dilated convolution on the facial image using the convolution layer to obtain a convolution feature.

In some embodiments, the semantic perception sub-network further comprises a pooling layer; and the semantic feature extraction module is further configured to perform multi-scale pooling of the convolution feature using the pooling layer to obtain multi-scale pooled features, and concatenate the multi-scale pooled features and the convolution feature.

In some embodiments, the boundary perception sub-network and the fusion sub-network comprise a convolution layer.

According to a fourth aspect of the present disclosure, there is provided a training apparatus for a face parsing neural network, configured to: train the face parsing neural network in advance using sample facial images annotated with a facial region to which each pixel belongs, wherein: the trained face parsing neural network is configured to output a facial region to which each pixel in an input facial image belongs according to the input facial image; the facial parsing neural network comprises a semantic perception sub-network, a boundary perception sub-network and a fusion sub-network; the semantic perception sub-network is configured to extract a semantic feature from the sample facial images, the semantic feature representing probabilities that each pixel in the sample facial images belongs to various facial regions; the boundary perception sub-network is configured to extract a boundary feature from the sample facial images, the boundary feature representing probabilities that each pixel in the sample facial images belongs to boundaries between different facial regions; and the fusion sub-network is configured to process the concatenated semantic feature and boundary feature to obtain a facial region to which each pixel in the sample facial images belongs.

According to a fifth aspect of the present disclosure, there is provided an electronic device, comprising: a memory; and a processor coupled to the memory, the processor configured to perform the foregoing face parsing method or training method based on instructions stored in the memory.

According to a sixth aspect of the present disclosure, a non-transitory computer-readable storage medium is provided on which computer program instructions are stored, which when executed by a processor implement the foregoing face parsing method or training method.

Other features and advantages of the present invention will become apparent from the following detailed description of exemplary embodiments of the present disclosure with reference to the accompanying drawings.

BRIEF DESCRIPTION OF THE DRAWINGS

In order to more clearly explain the embodiments of the present disclosure or the technical solutions in the prior art, a brief introduction will be given below for the drawings required to be used in the description of the embodiments or the prior art. It is obvious that, the drawings illustrated as follows are merely some of the embodiments of the present disclosure. For a person skilled in the art, he or she may also acquire other drawings according to such drawings on the premise that no inventive effort is involved.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by persons of ordinary skill in the art based on the embodiments of the present disclosure without creative efforts shall fall within the protection scope of the present disclosure.

Semantic segmentation is a basic task in computer vision. In semantic segmentation, a visual input needs to be segmented into different semantic interpretable categories. The inventors believe that face parsing is a pixel level semantic segmentation task. Although deep learning has strong feature extraction ability, its ability to segment pixels in boundary regions (areas between different face regions) needs to be improved. There are two main reasons: First, boundary pixels are located in junction areas of different categories, which have certain semantic confusion and belong to pixels that are difficult to distinguish; Second, pooling and convolution with a stride greater than one can increase the receptive field, but also can reduce the resolution of the feature map, especially cause the loss of information in the boundary regions. The above two aspects are the main reasons why the pixels in boundary regions are difficult to distinguish.

The traditional face parsing technology mainly improves the performance of face parsing by changing the basic structure of neural networks or through block processing, both of which are operations targeted to the whole of a feature map and do nothing specially for the pixels of boundary regions, so they still cannot solve the problem of low segmentation accuracy of boundary regions. For a face parsing task, the proportion of boundary regions in the entire face region is larger than that of scene analysis and other tasks, so improving the discrimination accuracy of boundary regions is critical to improve the accuracy of face parsing. Taking face parsing as an example, the disclosure discusses how to improve the accuracy of face parsing.

A technical problem to be solved by the present disclosure is how to improve the accuracy of face parsing.

The present disclosure can improve the ability of a neural network to discriminate boundary pixels between different facial regions in a facial image, so as to improve the accuracy of face parsing.

Figure 1:
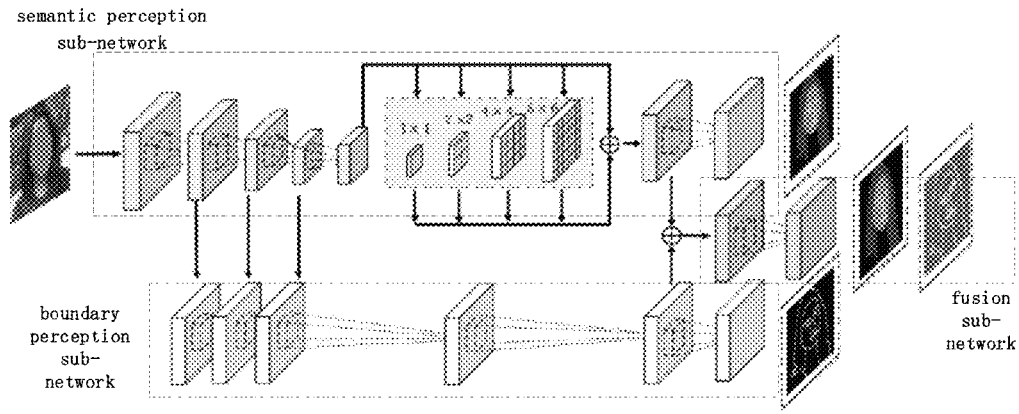
FIG. 1 shows a structural diagram of a face parsing neural network according to some embodiments of the present disclosure.

First, some embodiments of a face parsing neural network adopted in the present disclosure will be introduced with reference to FIG. 1.

FIG. 1 shows a structural diagram of a face parsing neural network according to some embodiments of the present disclosure. As shown in FIG. 1, the face parsing neural network includes three branches: a semantic perception sub-network, a boundary perception sub-network and a fusion sub-network. The semantic perception sub-network may comprise a convolution layer and a pooling layer. The boundary perception sub-network and fusion sub-network may comprise a convolution layer.

(1) Semantic Perception Sub-Network

The semantic perception sub-network is used for semantic segmentation of an input RGB (Red, Green and Blue) facial image, that is, each pixel is given a semantic label (such as eye, nose, etc.), so as to extract a semantic feature from the facial image, wherein the semantic feature represents probabilities that each pixel in the facial image belongs to various facial regions. Mainstream segmentation networks such as PSPNet (Pyramid Spatial Pooling Network) and Deeplab can be adopted as the semantic perception sub-network. This embodiment preferably adopts the residual network ResNet-101 as a skeleton segmentation network. The size of the semantic feature (feature map) extracted by the semantic perception sub-network is N×C×W×H, wherein N represents a batch size, C represents the number of semantic label categories, and W and H represent the width and height of the semantic feature.

(2) Boundary Perception Sub-Network

The boundary perception sub-network is used to extract a boundary feature from the facial image, the boundary feature representing probabilities that each pixel in the facial image belongs to boundaries between different facial regions. In other words, the boundary perception sub-network can deal with a binary classification problem: predicting whether each pixel of an input RGB facial image belongs to boundary regions. Taking ResNet (Residual Network)—101 as the skeleton segmentation network as an example, from the last convolution layer of each of the three middle convolution blocks of the five convolution blocks of ResNet-101, the boundary perception sub-network can extract a convolution feature. Then, the three convolution features are mapped to the same size (for example, the image size of the convolution feature is changed by a resizing operation) and concatenated into a combined convolution feature. Then, the combined convolution feature is mapped into a new feature space through a series of convolution operations. The size of the output boundary feature (a predicted boundary map) is N×2×W×H, wherein N, W and H are consistent with the semantic perception sub-network, and only the number of channels is different. The number of channels of the boundary feature is 2 (indicating whether a pixel belongs to a boundary or not). Each pixel in the boundary feature corresponds to a two-dimensional vector representing the probabilities that the pixel belongs to a foreground (boundary) and a background (non boundary) respectively.

(3) Fusion Sub-Network

The fusion sub-network is used for accurate semantic segmentation of the input RGB facial image, that is, convolving the concatenated semantic feature and boundary feature to obtain a fusion feature of the facial image. The fusion feature represents the prediction probabilities that each pixel in the facial image belongs to various facial regions and the prediction probabilities that each pixel in the facial image belongs to the boundaries. The feature map size of the fusion feature is also N×C×W×H, wherein N represents a batch size, C represents the number of categories, and W and H represent the width and height of the output feature map. The fusion sub-network further determines a facial region to which each pixel in the face image belongs according to the fusion feature, particularly by a Softmax normalization function.

(4) Training of Face Parsing Neural Network

When training the face parsing neural network, sample facial images annotated with a facial region to which each pixel belongs are used to train the face parsing neural network. The trained face parsing neural network can output a facial region to which each pixel in a facial image belongs according to an input facial image.

(5) Loss Function of the Face Parsing Neural Network

The loss function L used in training the face parsing neural network can include a loss function $L_s$ of the semantic perception sub-network and a loss function $L_b$ of the boundary perception sub-network, that is, $L=\lambda_1 L_s+\lambda_2 L_b$, wherein both $\lambda_1$ and $\lambda_2$ are greater than zero, and are weights of loss functions of two different branches.

The loss function of the semantic perception sub-network is determined according to prediction probabilities that each pixel of the semantic feature belongs to various facial regions, and a facial region each pixel of the semantic feature actually belongs to. For example, the loss function $L_s$ of the semantic perception sub-network is $$L_s = -\frac{1}{N}\sum_{i=1}^{N}\sum_{j=1}^{C} y_{ij}^s \log p_{ij}^s$$

Wherein: N is the total number of pixels in the semantic feature, i is an identity of pixels in the semantic feature, C is the total number of categories of facial regions, and j is an identity of the categories of the facial regions. If pixel i actually belongs to facial region j, $y_{ij}^s=1$. If pixel i does not actually belong to facial region j, $y_{ij}^s=0$. $p_{ij}^s$ is the predicted probability that pixel i belongs to facial region j, that is, an output value of the semantic feature extracted by the semantic perception sub-network after Softmax.

The loss function of the boundary perception sub-network is determined according to prediction probabilities that each pixel of the boundary feature belongs to boundaries between different facial regions, and whether each pixel of the boundary feature actually belongs to the boundaries. For example, the loss function $L_b$ of the boundary perception sub-network is $$L_b = -\frac{1}{N}\sum_{i=1}^{N}\left(y_i^b \log p_i^b + (1-y_i^b)\log(1-p_i^b)\right)$$

wherein: N is the total number of pixels in the boundary feature, and i is an identity of pixels in the boundary feature. If pixel i actually belongs to the boundaries, $y_i^b=1$, or if pixel i does not actually belong to the boundaries, $y_i^b=0$. $p_i^b$ is the prediction probability that pixel i belongs to the boundaries. The boundary map (Ground truth) of the boundary perception sub-network is used to indicate whether each pixel belongs to boundary regions. By optimizing the above loss function, the boundary perception sub-network can make full use of boundary information of the facial image, so as to predict the probability that each pixel belongs to a boundary region.

The loss function L used in training the face parsing neural network can further comprise a loss function $L_f$ of the fusion sub-network, that is, $L=\lambda_1 L_s+\lambda_2 L_b+\lambda_3 L_f$, wherein $\lambda_1$, $\lambda_2$ and $\lambda_3$ are all greater than zero, and are weights of loss functions of three different branches. Those skilled in the art should understand that $\lambda_1$, $\lambda_2$ and $\lambda_3$ can be adjusted according to practical needs, for the better performance of some branches in the face parsing neural network. For example, if the value of $\lambda_2$ is set to be larger, better boundary perception performance can be achieved in the face parsing neural network.

The loss function of the fusion sub-network is determined according to prediction probabilities that each pixel of the fusion feature belongs to various facial regions, a facial region each pixel of the fusion feature actually belongs to, and whether each pixel of the fusion feature belongs to the boundaries. For example, the loss function $L_f$ of the fusion sub-network is $$L_f = -\frac{1}{N}\sum_{i=1}^{N}\sum_{j=1}^{C} w_i y_{ij}^s \log p_{ij}^s$$

wherein: N is the total number of pixels in the fusion feature, i is an identity of pixels in the fusion feature, C is the total number of categories of facial regions, and j is an identity of the categories of the facial region. If pixel i actually belongs to facial region j, $y_{ij}^s=1$, or if pixel i does not actually belong to facial region j, $y_{ij}^s=0$. $p_{ij}^s$ is the prediction probability that pixel i belongs to facial region j. $w_i$ is a value corresponding to pixel i in a weight map, indicating the weight coefficient of pixel i. If pixel i actually belongs to the boundaries (i.e., $y_i^b=1$), $w_i>1$ ($w_i=1+\alpha$, wherein $\alpha$ is a positive value used to increase the weight of a boundary pixel). If pixel i does not actually belong to the boundaries (i.e., $y_i^b=0$), $w_i=1$. Using the boundary map (Ground truth) of the boundary perception sub-network, a weight map can be constructed to weight the loss of boundary pixels.

Those skilled in the art should understand that the function realized by each branch in the face parsing neural network depends on the loss function corresponding to each branch. After training the face parsing neural network with a total loss function composed of the loss functions corresponding to the various branches, each branch of the face parsing neural network can have a corresponding function. Also, $\lambda_1$, $\lambda_2$, $\lambda_3$ and a in this embodiment can be adjusted and determined according to the experimental results.

This embodiment provides a face parsing neural network. On the one hand, more boundary pixel information is obtained by combining boundary perception feature and semantic perception feature; on the other hand, the loss of boundary pixels is weighted to improve the influence of boundary pixels. Therefore, the face parsing neural network provided by this embodiment is more sensitive to boundary pixels belonging to (between) different facial regions in the facial image, and can pay more attention to boundary pixels that are difficult to distinguish and recognize.

Some embodiments of the face parsing method of the present disclosure will be described below with reference to FIG. 2.

Figure 2:
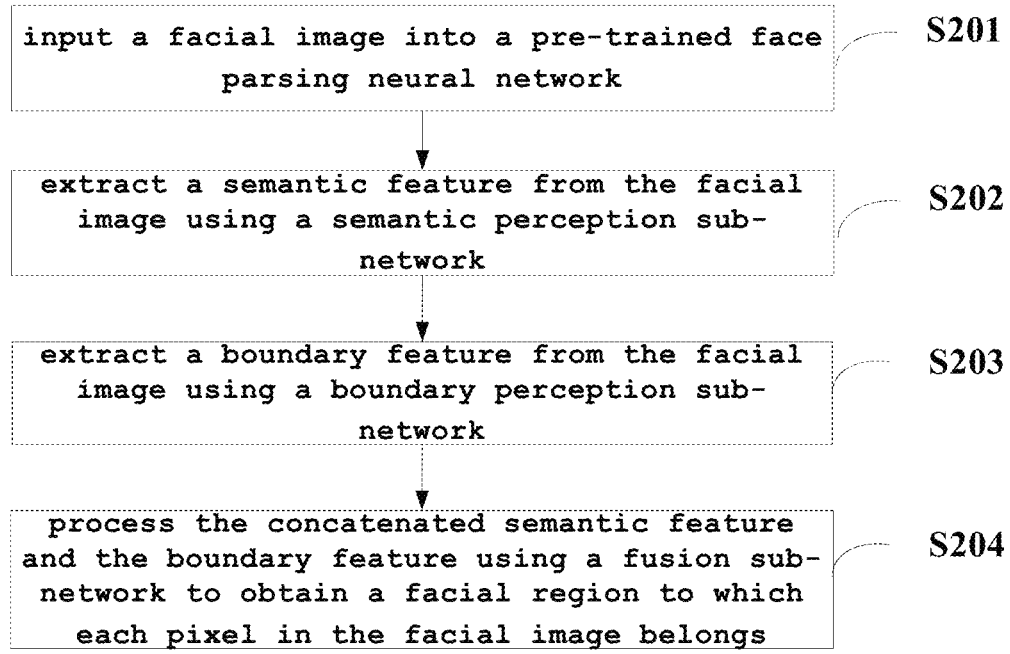
FIG. 2 shows a flowchart of the face parsing method according to some embodiments of the present disclosure.

FIG. 2 shows a flowchart of the face parsing method according to some embodiments of the present disclosure. As shown in FIG. 2, this embodiment includes steps S201 to S204.

In step S201, a facial image is input into a pre-trained face parsing neural network.

In step S202, a semantic feature is extracted from the facial image using a semantic perception sub-network of the face parsing neural network, wherein the semantic feature represents probabilities that each pixel in the facial image belongs to various facial regions. For example, the facial image comprises the facial regions R1 and R2. And the facial image comprises pixels P1 and P2. The probabilities represented by the semantic feature comprise probability that pixel P1 belongs to facial region R1, probability that pixel P1 belongs to facial region R2, probability that pixel P2 belongs to facial region R1, and probability that pixel P2 belongs to facial region R2.

In some embodiments, dilated convolution or atrous convolution is performed on the facial image using a convolution layer to obtain a convolution feature.

For example, in order to reduce the loss of resolution information, dilated convolution can be adopted in the fifth convolution block of ResNet-101, so that the resolution of the output feature map is 1/16 of the input facial image, instead of 1/32 of the input facial image, thereby retaining detailed information of the facial image to a certain extent. Those skilled in the art should understand that dilated convolution can also be used in other convolution blocks, and can be used in multiple convolution blocks.

In some embodiments, the convolution feature is pooled over multiple scales by using the pooling layer to obtain the multi-scale pooled features, which are then concatenated with the convolution feature.

For example, in order to make better use of the global feature of facial image, the multi-scale pooling operation in PSPNet can be adopted. As shown in FIG. 1, the convolution feature output from the last convolution layer of the fifth convolution block of ResNet-101 is pooled over four scales, namely 1×1, 2×2, 4×4 and 6×6. Then these pooled features are concatenated with the convolution feature that has not been pooled for label prediction. Those skilled in the art should understand that these features of different sizes can be mapped to the same size before concatenation (for example, using a resize operation to change the image size of the pooled feature) and then concatenated into a combined pooled feature.

In step S203, a boundary feature is extracted from the facial image using a boundary perception sub-network of the face parsing neural network, wherein the boundary feature represents probabilities that each pixel in the facial image belongs to boundaries between different facial regions.

In step S204, the semantic feature and the boundary feature, upon concatenation thereof, are processed using a fusion sub-network of the face parsing neural network to obtain a facial region to which each pixel in the facial image belongs.

This embodiment can improve the ability of a neural network to discriminate boundary pixels between different facial regions in a facial image, so as to improve the accuracy and overall performance of face parsing.

The effectiveness of the present disclosure can be more intuitively verified by the following experimental data.

The contributions of the various branches are compared on the LaPa face parsing dataset. The LaPa dataset contains 22000 facial images, each of which contains 106-point landmarks and 11-category pixel level facial parsing annotations. The 11 categories comprise hair, skin, left eyebrow, right eyebrow, left eye, right eye, nose, upper lip, inside the mouth, lower lip and background. Three models are compared, in which model A represents a result of using only a semantic perception sub-network, and model B represents the performance of adding a boundary perception sub-network and a fusion sub-network on the basis of model A, but without loss weighting, that is, $w_i$ is always set to 1 in $L_f$; model C represents the performance of adding loss weighting on the basis of model B, that is, after the introduction of a. The performance comparison results of the three models are shown in Table 1. The values in Table 1 are F1-scores. F1-score is an index used to measure the accuracy of a two classification model in statistics, which takes into account the accuracy and recall of the classification model at the same time, and can be regarded as a weighted average of model accuracy and recall. F1-score has a maximum value of 1 and a minimum value of 0. The calculation formula of F1-score is as follows:

$$F1-score = 2 \times \frac{accuracy \times recall}{accuracy + recall}$$

TABLE 1

| % | Hair | Skin | Left eyebrow | Right eyebrow | left eye | Right eye | Nose | Upper lip | Inside the mouth | Lower lip | Background | Average |
|---|------|------|--------------|---------------|----------|-----------|------|-----------|------------------|-----------|------------|---------|
| Model A | 94.86 | 95.95 | 81.79 | 81.61 | 81.50 | 81.69 | 93.79 | 80.10 | 84.10 | 80.45 | 98.76 | 85.58 |
| Model B | 95.30 | 96.27 | 83.32 | 82.82 | 82.45 | 82.72 | 94.43 | 81.25 | 84.73 | 81.24 | 98.86 | 86.45 |
| Model C | 95.32 | 96.54 | 84.34 | 84.27 | 84.86 | 85.17 | 94.66 | 82.45 | 85.63 | 82.31 | 98.86 | 87.55 |

Figure 3:
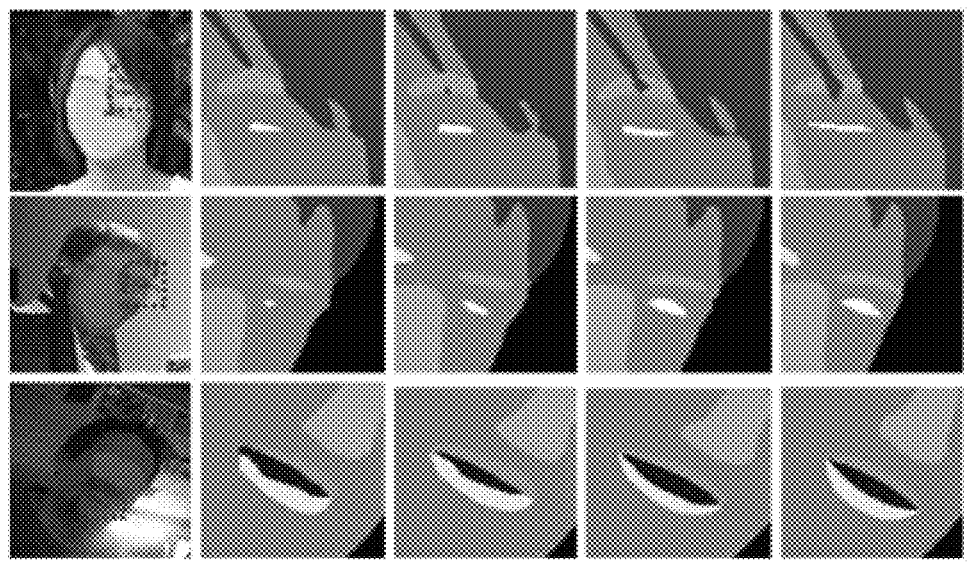
FIG. 3 shows visual face parsing results corresponding to three face parsing models.

As can be seen from Table 1, the average F1-score of model B increased by 0.87% compared with model A, and each sub-class has a certain degree of improvement, which proves that adding the boundary perception sub-network can effectively improve the overall face parsing accuracy. Compared with model B, the average F1-score of model C is increased by 1.1%, which proves that it is also effective to use the boundary map to weight the loss of the pixels in the boundary regions. Model C has achieved high recognition accuracy performance in each subclass. It can be seen that the boundary perception feature and the use of the boundary map to weight boundary pixel losses are both effective methods to improve the performance of face parsing. FIG. 3 shows visual face parsing results corresponding to three face parsing models. As shown in FIG. 3, the first column shows the original input images, and the last four columns are the results of enlarged portions in the dotted boxes in the first column of images. The second column shows the face parsing result corresponding to model A, and the third column shows the face parsing result corresponding to model B, the fourth column shows the face parsing result corresponding to model C, and the fifth column shows the true values.

Some embodiments of a face parsing apparatus of the present disclosure will be described below with reference to FIG. 4.

Figure 4:
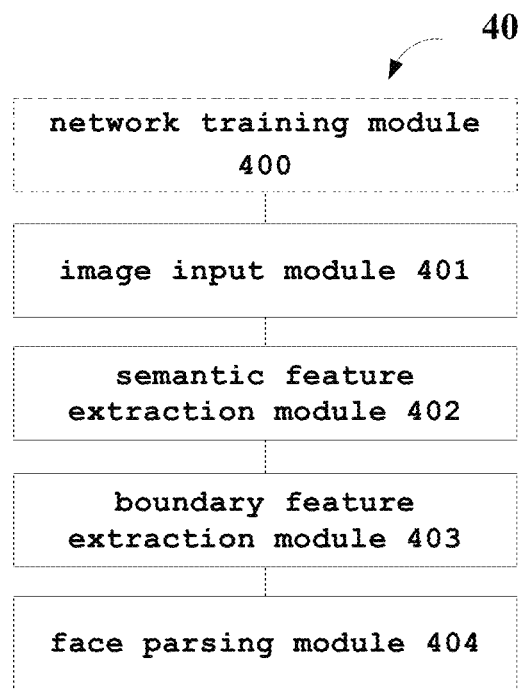
FIG. 4 shows a structural diagram of a face parsing apparatus according to some embodiments of the present disclosure.

FIG. 4 shows a structural diagram of the face parsing apparatus according to some embodiments of the present disclosure. As shown in FIG. 4, the face parsing apparatus 40 in this embodiment comprises
- an image input module 401 configured to input a facial image into a pre-trained face parsing neural network; a semantic feature extraction module 402 is configured to extract a semantic feature from the facial image using a semantic perception sub-network of the face parsing neural network, wherein the semantic feature represents probabilities that each pixel in the facial image belongs to various facial regions; a boundary feature extraction module 403 is configured to extract a boundary feature from the facial image using a boundary perception sub-network of the face parsing neural network, wherein the boundary feature represents probabilities that each pixel in the facial image belongs to boundaries between different facial regions; a face parsing module 404 is configured to process the concatenated semantic feature and boundary feature using a fusion sub-network of the face parsing neural network to obtain a facial region to which each pixel in the facial image belongs.

In some embodiments, the face parsing apparatus 40 further comprises a network training module 400 configured to: train a face parsing neural network using sample facial images annotated with a facial region to which each pixel belongs, so that the trained face parsing neural network can output a facial region to which each pixel in a facial image belongs according to an input facial image.

In some embodiments, a loss function adopted by the network training module 400 to train the face parsing neural network comprises a loss function of the semantic perception sub-network and a loss function of the boundary perception sub-network. The loss function of the semantic perception sub-network is determined according to prediction probabilities that each pixel of the semantic feature belongs to various facial regions, and a facial region each pixel of the semantic feature actually belongs to. The loss function of the boundary perception sub-network is determined according to prediction probabilities that each pixel of the boundary feature belongs to boundaries between different facial regions, and whether each pixel of the boundary feature actually belongs to the boundaries.

In some embodiments, the face parsing module 404 is configured to: process the concatenated semantic feature and boundary feature using a fusion sub-network of the face parsing neural network to obtain a fusion feature from the facial image, wherein the fusion feature represents prediction probabilities that each pixel in the facial image belongs to various facial regions and prediction probabilities that each pixel in the facial image belongs to boundaries; determine a facial region to which each pixel in the facial image belongs according to the fusion feature.

In some embodiments, the loss function adopted by the network training module 400 to train the face parsing neural network further comprises a loss function of the fusion sub-network. The loss function of the fusion sub-network is determined according to prediction probabilities that each pixel of the fusion feature belongs to various facial regions, a facial region each pixel of the fusion feature actually belongs to, and whether each pixel of the fusion feature belongs to the boundaries.

In some embodiments, the loss function $L_s$ of the semantic perception sub-network is $$L_s = -\frac{1}{N}\sum_{i=1}^{N}\sum_{j=1}^{C} y_{ij}^s \log p_{ij}^s$$

wherein: N is the total number of pixels in the semantic feature, i is an identity of pixels in the semantic feature, C is the total number of categories of facial regions, and j is an identity of the categories of the facial regions. If pixel i actually belongs to facial region j, $y_{ij}^s=1$, or if pixel i does not actually belong to facial region j, $y_{ij}^s=0$. $p_{ij}^s$ is the prediction probability that pixel i belongs to facial region j.

In some embodiments, the loss function $L_b$ of the boundary perception sub-network is $$L_b = -\frac{1}{N}\sum_{i=1}^{N}\left(y_i^b \log p_i^b + (1-y_i^b)\log(1-p_i^b)\right)$$

wherein: N is the total number of pixels in the boundary feature, and i is an identity of pixels in the boundary feature. If pixel i actually belongs to the boundaries, $y_i^b=1$, or if pixel i does not actually belong to the boundaries, $y_i^b=0$. $p_i^b$ is the prediction probability that pixel i belongs to the boundaries.

In some embodiments, the loss function $L_f$ of the fusion sub-network is $$L_f = -\frac{1}{N}\sum_{i=1}^{N}\sum_{j=1}^{C} w_i y_{ij}^s \log p_{ij}^s$$

wherein: N is the total number of pixels in the fusion feature, i is an identity of pixels in the fusion feature, C is the total number of categories of facial regions, and j is an index of categories of facial regions. If pixel i actually belongs to facial region j, $y_{ij}^s=1$, or if pixel i does not actually belong to facial region j, $y_{ij}^s=0$. $p_{ij}^s$ is the prediction probability that pixel i belongs to facial region j. If pixel i actually belongs to the boundaries, $w_i>1$, or if pixel i does not actually belong to the boundaries, $w_i=1$.

In some embodiments, the semantic perception sub-network includes a convolution layer. The semantic feature extraction module 402 is configured to perform dilated convolution on the facial image using the convolution layer to obtain a convolution feature.

In some embodiments, the semantic perception sub-network further comprises a pooling layer. The semantic feature extraction module 402 is further configured to perform multi-scale pooling of the convolution feature using the pooling layer to obtain multi-scale pooled features, and concatenate the multi-scale pooled features and the convolution feature.

In some embodiments, the boundary perception sub-network and the fusion sub-network comprise convolution layers.

This embodiment can improve the ability of a neural network to discriminate boundary pixels between different facial regions in a facial image, so as to improve the accuracy and overall performance of face parsing.

Below, some other embodiments of the electronic device of the present disclosure will be described with reference to FIG. 5.

Figure 5:
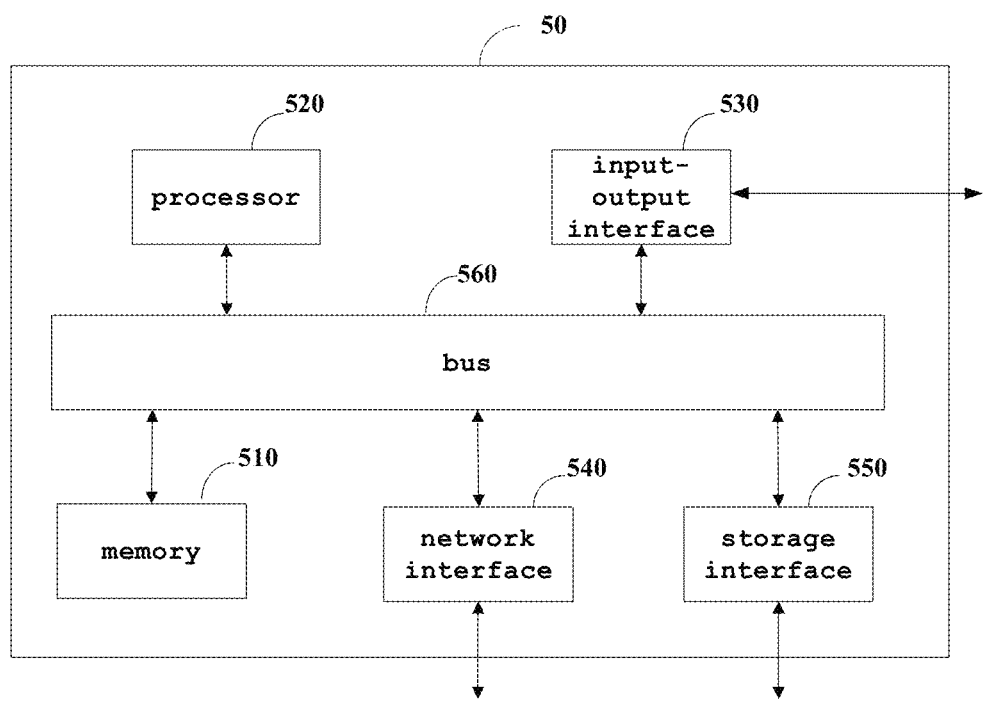
FIG. 5 shows a structural diagram of an electronic device according to some embodiments of the present disclosure.

FIG. 5 shows a structural diagram of an electronic device according to some embodiments of the present disclosure. As shown in FIG. 5, the electronic device 50 of this embodiment comprises a memory 510 and a processor 520 coupled to the memory 510. The processor 520 configured to, based on instructions stored in the memory 510, carry out the face parsing method according to any one of the foregoing embodiments.

The memory 510 may include, for example, system memory, a fixed non-volatile storage medium, or the like. The system memory stores, for example, an operating system, application programs, a boot loader (Boot Loader), and other programs.

The electronic device 50 may further comprise an input-output interface 530, a network interface 540, a storage interface 550, and the like. These interfaces 530, 540, 550 and the memory 510 and the processor 520 may be connected through a bus 560, for example. The input-output interface 530 provides a connection interface for input-output devices such as a display, a mouse, a keyboard, and a touch screen. The network interface 540 provides a connection interface for various networked devices. The storage interface 550 provides a connection interface for external storage devices such as an SD card and a USB flash disk.

The present disclosure further provides a computer-readable storage medium having stored thereon computer instructions that, when executed by a processor, implement the face parsing method of any one of the foregoing embodiments.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc shall be contained in the protection scope of this disclosure.

What is claimed is:

1. A face parsing method, comprising:
inputting a facial image into a pre-trained face parsing neural network;
extracting a semantic feature from the facial image using a semantic perception sub-network of the face parsing neural network, wherein the semantic feature represents probabilities that each pixel in the facial image belongs to various facial regions;
extracting a boundary feature from the facial image using a boundary perception sub-network of the face parsing neural network, wherein the boundary feature represents probabilities that each pixel in the facial image belongs to boundaries between different facial regions; and
processing the concatenated semantic feature and boundary feature using a fusion sub-network of the face parsing neural network to obtain a facial region to which each pixel in the facial image belongs,
wherein a loss function used in training the face parsing neural network includes a loss function of the semantic perception sub-network and a loss function of the boundary perception sub-network, wherein:
the loss function of the semantic perception sub-network is determined according to prediction probabilities that each pixel of the semantic feature belongs to various facial regions, and a facial region each pixel of the semantic feature actually belongs to; and
the loss function of the boundary perception sub-network is determined according to prediction probabilities that each pixel of the boundary feature belongs to boundaries between different facial regions, and whether each pixel of the boundary feature actually belongs to the boundaries.

2. The face parsing method according to claim 1, wherein:
the semantic perception sub-network includes a convolution layer; and
extracting a semantic feature from the facial image using a semantic perception sub-network comprises performing dilated convolution on the facial image using the convolution layer to obtain a convolution feature.

3. The face parsing method according to claim 1, wherein:
the semantic perception sub-network further comprises a pooling layer; and
extracting a semantic feature from the facial image using a semantic perception sub-network further comprises performing multi-scale pooling of the convolution feature using the pooling layer to obtain multi-scale pooled features, and concatenating the multi-scale pooled features and the convolution feature.

4. The face parsing method according to claim 1, wherein the boundary perception sub-network and the fusion sub-network comprise a convolution layer.

5. An electronic device, comprising:
a memory; and
a processor coupled to the memory, the processor configured to, based on instructions stored in the memory, carry out the face parsing method according to claim 1.

6. A non-transitory computer-readable storage medium on which computer instructions are stored, which when executed by a processor, carry out the face parsing method according to claim 1.

7. A training method for a face parsing neural network, comprising:
training the face parsing neural network in advance using sample facial images annotated with a facial region to which each pixel belongs, wherein:
the trained face parsing neural network is configured to output a facial region to which each pixel in the facial image belongs according to an input facial image;
the face parsing neural network comprises a semantic perception sub-network, a boundary perception sub-network and a fusion sub-network;
the semantic perception sub-network is configured to extract a semantic feature from the sample facial images, wherein the semantic feature represents probabilities that each pixel in the sample facial images belongs to various facial regions;
the boundary perception sub-network is configured to extract a boundary feature from the sample facial images, wherein the boundary feature represents probabilities that each pixel in the sample facial images belongs to boundaries between different facial regions; and
the fusion sub-network is configured to process the concatenated semantic feature and boundary feature to obtain a facial region to which each pixel in the sample facial images belongs,
wherein a loss function used in training the face parsing neural network includes a loss function of the semantic perception sub-network and a loss function of the boundary perception sub-network, wherein:
the loss function of the semantic perception sub-network is determined according to prediction probabilities that each pixel of the semantic feature belongs to various facial regions, and a facial region each pixel of the semantic feature actually belongs to; and
the loss function of the boundary perception sub-network is determined according to prediction probabilities that each pixel of the boundary feature belongs to boundaries between different facial regions, and whether each pixel of the boundary feature actually belongs to the boundaries.

8. The training method according to claim 7, wherein the fusion sub-network of the face parsing neural network is configured to process the concatenated semantic feature and boundary feature to obtain a fusion feature of the sample facial images, wherein:

the fusion feature represents prediction probabilities that each pixel in the sample facial images belongs to various facial regions and prediction probabilities that each pixel in the sample facial images belongs to the boundaries; and
the fusion feature is configured to determine a facial region to which each pixel in the sample facial images belongs.

9. The training method according to claim 8, wherein a loss function used in training the face parsing neural network further comprises a loss function of the fusion sub-network;
wherein the loss function of the fusion sub-network is determined according to prediction probabilities that each pixel of the fusion feature belongs to various facial regions, a facial region each pixel of the fusion feature actually belongs to, and whether each pixel of the fusion feature belongs to the boundaries.

10. The training method according to claim 9, wherein the loss function $L_f$ of the fusion sub-network is $$L_f = -\frac{1}{N}\sum\nolimits_{k=1}^{N}\sum\nolimits_{j=1}^{C} w_i y_{ij}^s \log p_{ij}^s,$$

wherein: N is the total number of pixels in the fusion feature, i is an identity of pixels in the fusion feature, C is the total number of categories of facial regions, j is an identity of the categories of the facial regions, $y_{ij}^s=1$ if pixel i actually belongs to facial region j, $y_{ij}^s=0$ if pixel i does not actually belong to facial region j, $p_{ij}^s$ is the prediction probability that pixel i belongs to facial region j, $w_i>1$ if pixel i actually belongs to the boundaries, and $w_i=1$ if pixel i does not actually belong to the boundaries.

11. A non-transitory computer-readable storage medium on which computer instructions are stored, which when executed by a processor, carry out the training method according to claim 9.

12. The training method according to claim 7, wherein the loss function $L_s$ of the semantic perception sub-network is $$L_s = -\frac{1}{N}\sum\nolimits_{k=1}^{N}\sum\nolimits_{j=1}^{C} y_{ij}^s \log p_{ij}^s,$$

wherein: N is the total number of pixels in the semantic feature, i is an identity of the pixels in the semantic feature, C is the total number of categories of facial regions, and j is an identity of the categories of the facial region; $y_{ij}^s=1$ if pixel i actually belongs to facial region j, $y_{ij}^s=0$ if pixel i does not actually belong to facial region j, and $p_{ij}^s$ is the prediction probability that pixel i belongs to facial region j.

13. The training method according to claim 7, wherein the loss function $L_b$ of the boundary perception sub-network is $$L_b = -\frac{1}{N}\sum\nolimits_{k=1}^{N} \left(y_i^b \log p_i^b + (1-y_i^b)\log(1-p_i^b)\right),$$

wherein: N is the total number of pixels in the boundary feature, i is an identity of pixels in the boundary feature, $y_i^b=1$ if pixel i actually belongs to the boundaries, $y_i^b=0$ if pixel i does not actually belong to the boundaries, and $p_i^b$ is the prediction probability that pixel i belongs to the boundaries.

14. A non-transitory computer-readable storage medium on which computer instructions are stored, which when executed by a processor, carry out the training method according to claim 7.

15. An electronic device, comprising:
a memory; and
a processor coupled to the memory, the processor configured to, based on instructions stored in the memory, carry out a training method for a face parsing neural network, comprising:
training the face parsing neural network in advance using sample facial images annotated with a facial region to which each pixel belongs, wherein:
the trained face parsing neural network is configured to output a facial region to which each pixel in the facial image belongs according to an input facial image;
the face parsing neural network comprises a semantic perception sub-network, a boundary perception sub-network and a fusion sub-network;
the semantic perception sub-network is configured to extract a semantic feature from the sample facial images, wherein the semantic feature represents probabilities that each pixel in the sample facial images belongs to various facial regions;
the boundary perception sub-network is configured to extract a boundary feature from the sample facial images, wherein the boundary feature represents probabilities that each pixel in the sample facial images belongs to boundaries between different facial regions; and
the fusion sub-network is configured to process the concatenated semantic feature and boundary feature to obtain a facial region to which each pixel in the sample facial images belongs,
wherein a loss function used in training the face parsing neural network includes a loss function of the semantic perception sub-network and a loss function of the boundary perception sub-network, wherein:
the loss function of the semantic perception sub-network is determined according to prediction probabilities that each pixel of the semantic feature belongs to various facial regions, and a facial region each pixel of the semantic feature actually belongs to; and
the loss function of the boundary perception sub-network is determined according to prediction probabilities that each pixel of the boundary feature belongs to boundaries between different facial regions, and whether each pixel of the boundary feature actually belongs to the boundaries.

16. The electronic device according to claim 15, wherein the fusion sub-network of the face parsing neural network is configured to process the concatenated semantic feature and boundary feature to obtain a fusion feature of the sample facial images, wherein:
the fusion feature represents prediction probabilities that each pixel in the sample facial images belongs to various facial regions and prediction probabilities that each pixel in the sample facial images belongs to the boundaries; and
the fusion feature is configured to determine a facial region to which each pixel in the sample facial images belongs.

17. The electronic device according to claim 16, wherein a loss function used in training the face parsing neural network further comprises a loss function of the fusion sub-network;
wherein the loss function of the fusion sub-network is determined according to prediction probabilities that each pixel of the fusion feature belongs to various facial regions, a facial region each pixel of the fusion feature actually belongs to, and whether each pixel of the fusion feature belongs to the boundaries.

* * * * *